Patented Jan. 2, 1951

2,536,079

UNITED STATES PATENT OFFICE 2,536,079

ALKYL-SUBSTITUTED CARBAMATES

Domenick Papa, Brooklyn, and Nathan Sperber, Bronx, N. Y., and Erwin Schwenk, Montclair, N. J., assignors to Schering Corporation, Bloomfield, N. J., a corporation of New Jersey No Drawing. Application July 23, 1946, Serial No. 685,776

6 Claims. (Cl. 260—482)

This invention relates to a new group of substances which have been found to possess strong spasmolytic activity. It is an object of the invention to prepare anti-spasmodics which possess not only powerful neurotropic activity but also strong musculotropic action.

It has been recognized by the medical profession that anti-spasmodics which are effective both against spasms of nervous origin and against those of muscular origin are of considerable therapeutic value. Such substances are particularly useful in those cases where the type of spasm cannot be readily classified.

The new substances of the invention comprise the general formula

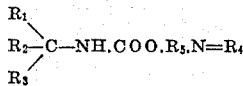

wherein $R_1$, $R_2$ and $R_3$ represent lower alkyl groups, particularly alkyl groups each containing not more than 5 carbon atoms and containing together from 8 to 15 carbon atoms, $R_4$ represents two lower alkyl groups containing from 1 to 5 carbon atoms or a bivalent alkyl chain, such as $-(CH_2)_5-$, and $R_5$ is a bivalent alkyl chain, preferably containing not more than three carbon atoms. The substances of this group have been found to possess both neurotropic and musculotropic activity.

The compounds of this invention may be prepared by reacting a tri-substituted methyl isocyanate with the appropriate basically substituted alkanol. For example, by condensing in any of several ways tributylmethyl isocyanate and β-diethylaminoethanol, there is obtained the β-diethylaminoethyl tributylmethyl carbamate. The reaction may be illustrated by the following equation:

$(C_4H_9)_3C-N=C=O + HOCH_2CH_2N(C_2H_5)_2 \rightarrow$
$(C_4H_9)_3C-NHCOOCH_2CH_2N(C_2H_5)_2$ In place of tributylmethyl isocyanate, other similarly substituted isocyanates may be used, such as ethyldibutylmethyl isocyanate, triamylmethyl isocyanate, triethylmethyl isocyanate. Other basically substituted alkanols may be used in place of the β-diethylaminoethanol. For example, 4-ethanol piperidine, β-dibutylaminoethanol, β-dimethylaminoethanol, γ-diethylaminopropanol, are useful intermediates.

The following example is illustrative of the methods by which the compounds of the invention may be prepared:

β-Diethylaminoethyl ester of tributylmethyl carbamic acid

Equimolecular proportions of tributylmethyl isocyanate and β-diethylaminoethanol are heated under reflux, preferably in a solvent such as xylene for approximately 20–30 hours. After stripping off the xylene in vacuo, the resulting carbamate is fractionally distilled in vacuum. It has been found advantageous to distill the carbamate as quickly as possible since slow distillation tends to regenerate the two starting materials. The pure β-diethylaminethyl tributylmethyl carbamate boils at 175–176°/3 mm.

For ease of administration as well as in compounding the substances of the invention are preferably used in the form of their salts, such as the hydrochlorides, the methiodides and the like.

The following table sets forth a number of typical spasmolytic substances of the invention, all of which may be prepared by the method described in the foregoing example by the reaction of the isocyanates and aminoalkanols indicated in the table. The table also gives the boiling points of the substances in degrees centigrade and their spasmolytic activities expressed on the basis of papaverine activity equal to 100% and atropine activity equal to 100%.

| No. | Isocyanate | Aminoalkanol | B. P. | Spasmolytic Activity | |
|---|---|---|---|---|---|
| | | | | Papaverine =100 | Atropine =100 |
| | | | | Percent | Percent |
| 1 | Triethylmethyl | β-diethylaminoethanol | 128–129°, 1 mm | <50 | <0.1 |
| 2 | Ethyldibutylmethyl | do | 172°/4 mm | 200 | 0.4 |
| 3 | Tributylmethyl | do | 175–176°, 3 mm | 600–850 | 2.5–4 |
| 4 | do | β-dimethylaminoethanol | 175–176°, 5 mm | 500–700 | 1 |
| 5 | do | β-dibutylaminoethanol | 181–183°, 2 mm | 500–700 | 1 |
| 6 | do | β-diethylaminopropanol | 165–166°, 1.5 mm | 600–700 | 1.8 |
| 7 | do | γ-diethylaminopropanol | 175–176°, 2 mm | 600 | 1.8 |
| 8 | do | β-piperidinoethanol | 179–181°, 1 mm | 500 | 0.6–1 |
| 9 | do | γ-dibutylaminopropanol | 175–178°, 1 mm | 400 | 0.5 |
| 10 | Triamylmethyl | β-diethylaminoethanol | 180–183°, 1 mm | 200–300 | 0.5 |

We claim:
1. Substituted carbamates of the general formula

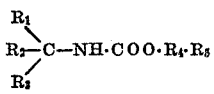

and the salts thereof, wherein $R_1$, $R_2$, and $R_3$ represent lower alkyl groups containing together from 10 to 15 carbon atoms, $R_4$ is a bivalent alkylene chain containing not more than 3 carbon atoms, and $R_5$ is selected from the group consisting of dialkylamino in which the alkyl groups contain from 1 to 4 carbon atoms and piperidino, and having both neurotropic and musculotropic spasmolytic activity.

2. The dialkylaminoethyl esters of tributyl-methyl carbamic acid, wherein the said alkyls each contain from 1 to 4 carbon atoms, and the salts thereof.

3. The dialkylaminopropyl esters of tributyl-methyl carbamic acid, wherein the said alkyls each contain from 1 to 4 carbon atoms, and the salts thereof.

4. The β-diethylaminoethyl ester of tributyl-methyl carbamic acid and salts thereof.

5. The β-diethylaminopropyl ester of tributyl-methyl carbamic acid and salts thereof.

6. The γ-diethylaminopropyl ester of tributyl-methyl carbamic acid and salts thereof.

DOMENICK PAPA.
NATHAN SPERBER.
ERWIN SCHWENK.

REFERENCES CITED

The following references are of record in the file of this patent:

UNITED STATES PATENTS

| Number | Name | Date |
|---|---|---|
| 2,408,893 | Swan et al. | Oct. 8, 1946 |

FOREIGN PATENTS

| Number | Country | Date |
|---|---|---|
| 370,693 | Great Britain | Apr. 14, 1932 |

OTHER REFERENCES

Donleavy et al.: "Jour. Am. Chem. Soc.," vol. 62 (1940), pp. 218–219.

Manual of Pharmacology—Sollman, 6th ed., page 299 (1942).

Bender: "Chem. Abstracts," vol. 37 (1943), p. 2075.